July 26, 1966  L. L. PORZKY ET AL  3,262,202
SHOCK ABSORBING MEANS FOR SHEARS
Filed May 18, 1964
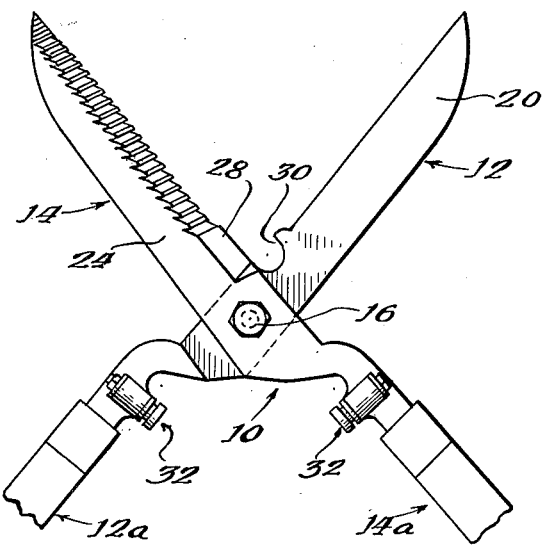
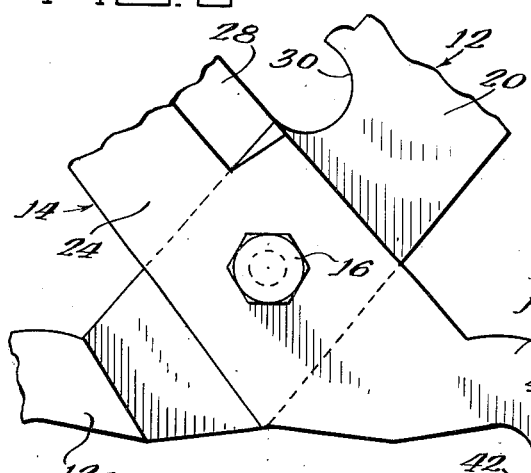
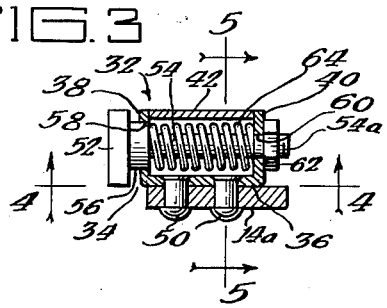
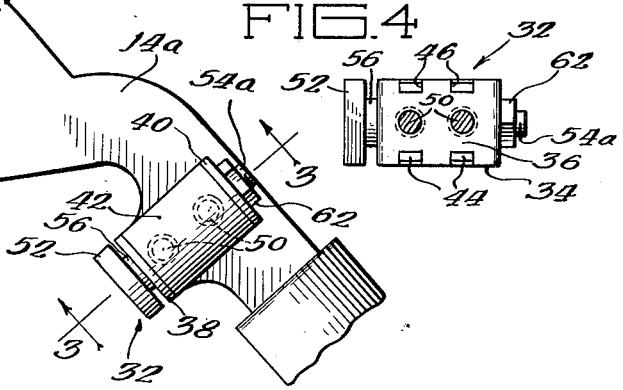
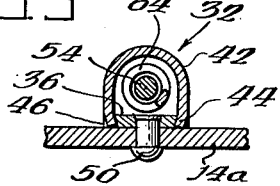
Inventors:
Leonhard L. Porzky
Jack D. Economy
By Hofgren, Wegner, Allen,
Stellman & McCord
Attorneys

United States Patent Office 3,262,202
Patented July 26, 1966

3,262,202
SHOCK ABSORBING MEANS FOR SHEARS
Leonhard L. Porzky, Watertown, Wis., and Jack D. Economy, Bellwood, Ill.; said Porzky assignor, by mesne assignments, to McGraw-Edison Company, Elgin, Ill., a corporation of Delaware
Filed May 18, 1964, Ser. No. 368,052
5 Claims. (Cl. 30—271)

This invention relates to trimming or pruning shears and more particularly to a shock absorbing means for such shears.

Trimming or pruning shears are scissor-like devices consisting of two pivoted blades which cut by means of the shearing action obtained by passing the inner faces of the blades across each other as the blades are swung about their pivotal mounting. Conventionally, this action is obtained by drawing the opposite or handled end of the blades toward each other to swing the cutting ends of the blades about the pivot and toward each other. Frequently, especially when trimming hedges and tree limbs, the shears must be brought together with a substantial amount of force in order to effectuate the cutting action. Once the limb stock has been cut through, the handle portions may be brought toward each other with a substantial amount of the force and speed ending abruptly in a sharp jarring as the two handle portions or fingers of the user of the shear strike each other, causing a great amount of discomfort. As a result many shears have been typically provided with bumper or shock absorbing devices usually in the form of a rubber bumper molded to a metal stud, none of which have been truly capable of withstanding, for the life of the shears, the severe forces and abuse to which such means are subjected in everyday operation.

It is therefore a primary object of this invention to provide a new and improved trimming device.

It is another object of this invention to provide a new and improved shock absorbing means for shear devices.

It is still another object of this invention to provide a new and improved shock absorbing device for a trimming shears which is capable of withstanding heavy forces imposed thereon as a result of the trimming action and yet is inexpensive to produce and easily mounted on the trimming shears.

Another object of this invention is to provide a new and improved shock absorber device for a trimming shears comprising a spring loaded bumper pad held in a sheet metal housing which is riveted to the handle members of a trimming device.

Other objects, features and advantages of the present invention will be apparent from the following description of the preferred embodiment illustrated in the accompanying drawings, in which:

FIGURE 1 is a fragmentary top plan view of trimming shears incorporating the shock absorber of this invention;

FIGURE 2 is an enlarged fragmentary plan view of the shears shown in FIGURE 1;

FIGURE 3 is a section view taken along the line 3—3 of FIGURE 2;

FIGURE 4 is a section view taken along the line 4—4 of FIGURE 3; and

FIGURE 5 is a section view taken along the line 5—5 of FIGURE 3.

The shears 10 of this invention include two metal blades 12 and 14 which are pivoted by a bolt 16. Each blade 12 and 14 is provided with a suitable handle portion, such as 12a and 14a, respectively, for grasping the shears to swing the blades about the pivot to perform the desired cutting function.

Each blade is provided with an inner face, such as 20, and an outer face, such as 24. The inner faces are in generally the same plane so that they slide in facial engagement between the blades when the blades are swung about the pivot. Adjacent the pivot, the blades are provided with pruning cutting edges 28 and 30 on the interior of the angle formed by the intersection of the two blades. The cutting edge 28 of the blade 14 is relatively straight whereas the cutting edge 30 of the blade 12 is generally hook-shaped.

The shock absorber or bumper means 32 of this invention is positioned on either handle portion of the shears near the pivot thereof in opposed spaced relation to each other so that when the handles are brought together the complementing bumpers will strike each other to absorb shock. The bumper means 32 includes a generally U-shaped base piece 34. Base piece 34 is preferably a sheet metal member which is stamped to form a substantially flat bottom wall 36 and two upstanding ears forming a front wall 38 and a rear wall 40. A generally semi-cylindrical top cover 42, which also is preferably a sheet metal stamping, is provided to form an enclosed housing in combination with the bottom and front and rear walls of the base piece. The cover 42 is provided with downwardly projecting ears 44 which are crimped inwardly and received in slots 46 of slightly smaller width than the ears formed in either edge of the base piece. The cover is held to the base by the frictional fit between the slots and ears. Rivets 50, which pass through the handle and through the bottom wall 36, secure the spring bumper to each of the handles.

The bumper is provided with a striking surface or bumper pad 52 which is positioned to the exterior of the housing and, when mounted to the handle, faces inwardly in opposition to the complementary bumper pad on the other handle. The bumper pad 52 is a generally flat plate-like member which forms the forward end of the reduced diameter rod 54 and is joined thereto by an intermediate diameter bearing surface 56. The bearing surface 56 extends through an opening 58 in the front wall of the assembly. The rod is positioned in the interior of the enclosure formed by the top and base pieces. The rear threaded end 54a of the rod extends through a smaller opening 60 in the rear wall and a nut 62 is threaded thereon to the exterior of the rear wall. The nut may be held fast to the shaft by well known means, such as by staking the nut. A torsion spring 64 surrounds the rod 54 and abuts the inside of the bearing surface 56 on one end and the interior of the rear wall 40 at its opposite end. In operation, as the handles are brought together so that the faces of the bumper pads strike each other, the springs 64 will compress permitting the shafts 54 to move laterally relative to their mountings as the springs absorb the shock of the blow.

The shock absorber means of this invention provides a suitable device for absorbing the force of swinging the handle portions of the shears together. The shock absorber means is a simple mechanical device which eliminates the difficulty of supporting rubber or similar absorbent material on metal and includes components which are simple metal stampings formed in their proper shape and provided with the necessary openings and ears, when stamped. Assembly of the device is simple. The openings in the two upstanding walls are of different dimension thereby making it impossible to position the bumper pad on the wrong end of the device. The shock absorber is held in the handle by two rivets. The rod may be inserted through the aligned openings and the spring is telescoped thereover. A nut is threaded to the end of the rod outside the rear wall. The cover may then be crimped thereover with the ears of the cover pressed into the slots of the bottom wall and held therein by the simple mechanical friction fit to enclose the device. Both the structure and assembly thereof are simple and economical and yet the device has the inherent strength and durability to last the life of the trimmer.

The foregoing detailed description has been given for clearness of understanding only, and no unnecessary limitations should be understood therefrom, for some modifications will be obvious to those skilled in the art.

We claim:

1. In combination, a pair of metal blades pivoted together for mutual sliding engagement, said blades having handle portions on one side of the pivot to be grasped to swing the blades about the pivot and bring the blades and handle portions together for cutting; mutually engageable shock absorber means on each of said handles, said shock absorber means comprising a metal base having upstanding walls to form a U-shaped frame, said walls having aligned openings therethrough for receiving a bumper member; means on said base member for securing the shock absorber to the handle portion of said blades adjacent said pivot; a bumper shaft having an enlarged end forming a bumper pad, said bumper shaft extending through the aligned openings in said walls; a spring about said shaft intermediate said walls, said spring abutting against one wall and said pad to absorb the forces received on said pad as said shaft moves laterally in response to said pad striking the shock absorber on the opposite handle as the blades are brought together; and a cover enclosing said base, said spring and said shaft.

2. The combination of claim 1 wherein said cover is provided with downwardly projecting ears and said shock absorber base is provided with outwardly facing notches along either edge thereof, said notches being slightly smaller than said ears to receive said ears in locking engagement to hold said cover to said base.

3. The combination of claim 1 wherein the opening in the front wall of said base member is larger than the opening in the rear wall of said base member and wherein said bumper pad is provided with an inwardly protruding bearing surface of a size to be received within said front wall opening and said shaft portion is of a reduced diameter and of a size to project through said rear wall opening and said spring abuts said rear wall and the interior of said bearing portion to absorb the forces received against said pad portion.

4. The combination of claim 3 wherein the distal end of said shaft is threaded for receiving a nut from the exterior of the rear wall to lock the bumper shaft to the frame, and permit only lateral movement of the shaft relative to the frame to compress the spring in response to forces received on the pad portion.

5. The combination of claim 4 wherein said cover is provided with downwardly projecting ears and said shock absorber base is provided with outwardly facing notches along either edge thereof, said notches being slightly smaller than said ears to receive said ears in locking engagement to hold said cover to said base.

References Cited by the Examiner

UNITED STATES PATENTS

| | | | |
|---|---|---|---|
| 1,469,693 | 10/1923 | Cloud | 16—85 X |
| 1,822,591 | 9/1931 | Hickok | 30—271 |
| 2,181,056 | 11/1939 | Irvine | 30—271 |
| 2,204,359 | 6/1940 | Hendrickson | 16—85 X |

WILLIAM FELDMAN, *Primary Examiner.*

J. C. PETERS, *Assistant Examiner.*